US011988997B2

(12) United States Patent
Yang

(10) Patent No.: US 11,988,997 B2
(45) Date of Patent: May 21, 2024

(54) SMART WATCH AND ANTENNA THEREOF

(71) Applicant: HUAWEI TECHNOLOGIES CO., LTD., Shenzhen (CN)

(72) Inventor: Shuxia Yang, Shandong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 267 days.

(21) Appl. No.: 17/432,452

(22) PCT Filed: Dec. 3, 2019

(86) PCT No.: PCT/CN2019/122775

§ 371 (c)(1),
(2) Date: Aug. 19, 2021

(87) PCT Pub. No.: WO2020/233088

PCT Pub. Date: Nov. 26, 2020

(65) Prior Publication Data

US 2022/0146986 A1 May 12, 2022

(30) Foreign Application Priority Data

May 23, 2019 (CN) ........................ 201910434749.X

(51) Int. Cl.
*H01Q 1/38* (2006.01)
*G04R 60/10* (2013.01)
(Continued)

(52) U.S. Cl.
CPC ............ *G04R 60/10* (2013.01); *H01Q 1/273* (2013.01); *H01Q 1/38* (2013.01); *H01Q 1/44* (2013.01); *H01Q 1/52* (2013.01)

(58) Field of Classification Search
CPC .......... G04R 60/10; H01Q 1/273; H01Q 1/38; H01Q 1/44; H01Q 1/52
(Continued)

(56) References Cited

U.S. PATENT DOCUMENTS

2018/0062245 A1 3/2018 Wu et al.
2018/0128924 A1 5/2018 Wu et al.
(Continued)

FOREIGN PATENT DOCUMENTS

CN 204991957 U 1/2016
CN 205508999 U 8/2016
(Continued)

OTHER PUBLICATIONS

International Search Report, English translation, from PCT/CN2019/122775 filed Dec. 3, 2019, dated Feb. 12, 2020.

*Primary Examiner* — Peguy Jean Pierre
(74) *Attorney, Agent, or Firm* — Leydig, Voit & Mayer, Ltd.

(57) ABSTRACT

An antenna of a smart watch is provided according to the present application, which includes a main antenna provided on a non-metallic casing of the smart watch and a coupling antenna located outside the main antenna and coupled with the main antenna. At least part of the main antenna is opposite to the coupling antenna, and the coupling antenna serves as a metal lug located at one side of the smart watch and is fixedly connected to the non-metallic casing. A smart watch is further provided according to the present application, which includes any of the above antennas.

20 Claims, 2 Drawing Sheets

(51) Int. Cl.
*H01Q 1/27* (2006.01)
*H01Q 1/44* (2006.01)
*H01Q 1/52* (2006.01)

(58) Field of Classification Search
USPC .......................................................... 343/718
See application file for complete search history.

(56) References Cited

U.S. PATENT DOCUMENTS

| | | | | |
|---|---|---|---|---|
| 2019/0379105 | A1* | 12/2019 | Sayem ................... | H01Q 5/335 |
| 2020/0243952 | A1* | 7/2020 | Zhu ........................ | G04R 60/02 |

FOREIGN PATENT DOCUMENTS

| | | | |
|---|---|---|---|
| CN | 106129602 | A | 11/2016 |
| CN | 107681266 | A | 2/2018 |
| CN | 108075221 | A | 5/2018 |
| CN | 110061351 | A | 7/2019 |
| EP | 3322031 | A1 | 5/2018 |

* cited by examiner

SMART WATCH AND ANTENNA THEREOF

The present application is a National Stage application of PCT international patent application PCT/CN2019/122775, filed on Dec. 3, 2019 which claims the priority to Chinese Patent Application No. 201910434749.X, titled "SMART WATCH AND ANTENNA THEREOF", filed with the China National Intellectual Property Administration on May 23, 2019, both of which are incorporated herein by reference in their entireties.

FIELD

The present application relates to the technical field of radio-frequency, and in particular to an antenna of a smart watch, and a smart watch.

BACKGROUND

With the development of technology, function of a watch is becoming more and more diversified. At present, most watches have a calling function, so an antenna needs to be arranged inside the watch. However, due to the limited internal space of the watch, the layout of the antenna is restricted. In addition, in order to ensure the reliability of a connection between a watch strap and a watch body, lug of the watch is mostly a metal structure, and the lug of the metal structure are apt to have an adverse effect on performance of the antenna. Therefore, a technical issue to be addressed by those skilled in the art is how to configure an antenna of the watch.

SUMMARY

In view of this, a first object of the present application is to provide an antenna for a smart watch, and structural design of the antenna can effectively solve the problem that lug of a metal structure are apt to have adverse effect on performance of the antenna.

In order to achieve the first object, the following technical solutions are provided according to the present application.

An antenna of a smart watch, including a main antenna provided on a non-metallic casing of the smart watch and a coupling antenna located outside the main antenna and coupled with the main antenna; at least part of the main antenna is opposite to the coupling antenna, and the coupling antenna serves as a metal lug located at one side of the smart watch and is fixedly connected to an outer wall surface of the non-metallic casing.

Preferably, in the above antenna of the smart watch, the main antenna is an LDS antenna, and a wiring of the LDS antenna is laser-etched on the non-metallic casing.

Preferably, in the above antenna of the smart watch, the wiring is laser-etched on an outer wall surface of the non-metallic casing, extends through a through hole to an inner wall surface of the non-metallic casing and forms a wiring point to be electrically connected to a printed circuit board of the smart watch.

Preferably, in the above antenna of the smart watch, the wiring extends from the outer wall surface of the non-metallic casing to an inner side of the coupling antenna, and an insulating layer is provided between the coupling antenna and the wiring.

Preferably, in the above antenna of the smart watch, the insulating layer is an insulating paint sprayed on the wiring.

Preferably, in the above antenna of the smart watch, the wiring that is interlaced with the coupling antenna is provided with a rubber-covered casing outside of the wiring for insulation, and the rubber-covered casing is fixedly connected to the non-metallic casing.

Preferably, in the above antenna of the smart watch, a side surface of the rubber-covered casing is closely attached to the coupling antenna.

Preferably, in the above antenna of the smart watch, the coupling antenna is detachably and fixedly connected to the non-metallic casing.

The antenna of the smart watch provided according to the present application includes a main antenna and a coupling antenna, where the main antenna is provided on a non-metallic casing of the smart watch and the coupling antenna locates outside the main antenna. At least part of the main antenna is opposite to the coupling antenna, and the coupling antenna is coupled to the main antenna. The coupling antenna serves as a metal lug located at one side of the smart watch and is fixedly connected to an outer wall surface of the non-metallic casing.

By applying the antenna of the smart watch provided according to the present application, the main antenna is provided on the non-metallic casing of the smart watch, and a metal lug at one side serves as the coupling antenna to couple to the main antenna to achieve the required high frequency or low frequency performance. With the arrangement of the coupling antenna, adverse effect of the metal lug on the antenna performance is avoided. Moreover, at least part of the main antenna is opposite to the coupling antenna, which also reduces restriction on the space layout of the main antenna, so that a space that the main antenna can use is larger, which is further conducive to ensuring performance of the antenna.

In order to achieve the second object, a smart watch is further provided according to the present application, which includes any of the above antennas. Since the above antennas have the above technical effects, the smart watch with the antenna should also have the corresponding technical effects.

Preferably, in the above smart watch, two metal lugs are symmetrically and fixedly connected to the outer wall surface of the non-metallic casing; one of the metal lugs is the coupling antenna, and the other of the metal lugs is interlaced with the main antenna.

BRIEF DESCRIPTION OF THE DRAWINGS

For more clearly illustrating embodiments of the present application or the technical solutions in the conventional technology, drawings referred to for describing the embodiments or the conventional technology will be briefly described hereinafter. Apparently, drawings in the following description are only examples of the present application, and for the person skilled in the art, other drawings may be obtained based on the provided drawings without any creative efforts.

Figure 1:
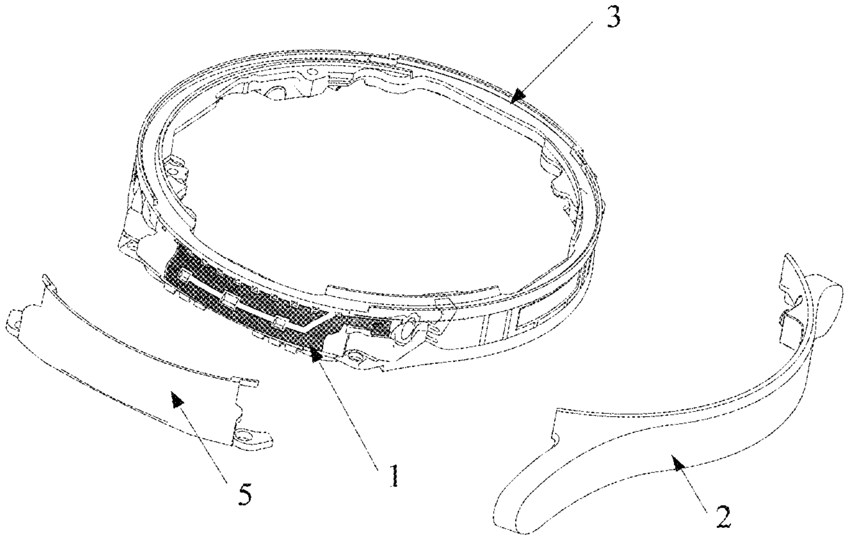
FIG. 1 is an explosive view of an antenna of a smart watch provided according to a specific embodiment of the present application.

REFERENCE NUMERALS IN THE FIGURES wiring 1, coupling antenna 2, non-metallic casing 3, printed circuit board 4, rubber-covered casing 5, first metal lug 6, display screen 7, contacting spring pin 8.

DETAILED DESCRIPTION OF THE EMBODIMENTS

An antenna of a smart watch is provided according to an embodiment of the present application, so as to avoid adverse effect of metal lug on performance of the antenna.

The technical solutions according to the embodiments of the present application will be described clearly and completely as follows in conjunction with the drawings in the embodiments of the present application. It is apparent that the described embodiments are only a part of the embodiments according to the present application, rather than all of the embodiments. Based on the embodiments of the present application, all other embodiments obtained without creative efforts by those of ordinary skill in the art shall fall within the protection scope of the present application.

Figure 2:
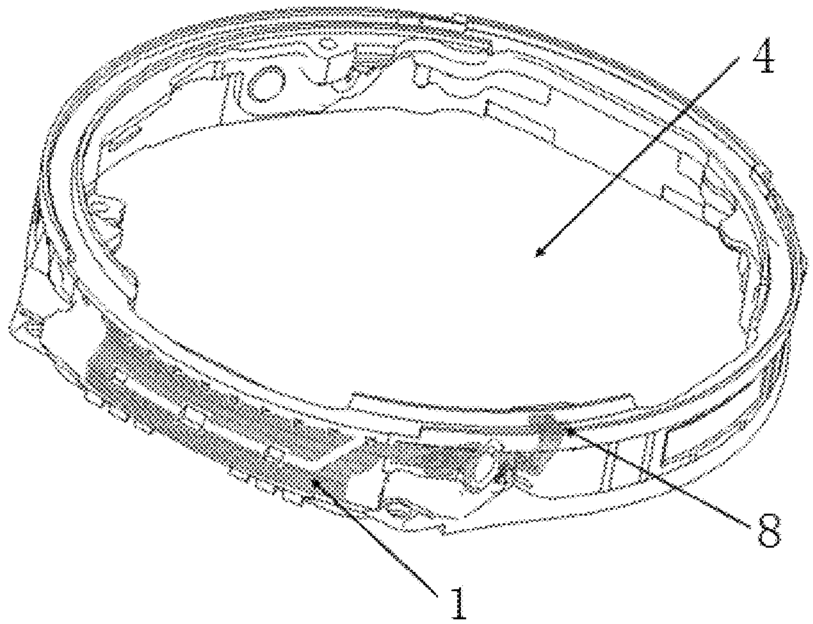
FIG. 2 is a schematic structural view of a main antenna in FIG. 1.

Reference is made to FIG. 1 and FIG. 2, where FIG. 1 is an explosive view of an antenna of a smart watch provided according to a specific embodiment of the present application; FIG. 2 is a schematic structural view of a main antenna in FIG. 1.

In a specific embodiment, the antenna of the smart watch provided by the present application includes a main antenna and a coupling antenna 2.

The main antenna is provided on the non-metallic casing 3 of the smart watch. The non-metallic casing 3 is a support structure of the smart watch, which may be in a ring shape including an inner wall surface and an outer wall surface, and there is a certain thickness between the inner wall surface and the outer wall surface. The main antenna is provided on the non-metallic casing 3, and the non-metallic structure may not adversely affect performance of the antenna. The main antenna is provided with a wiring point, i.e., a contacting PAD point to be electrically connected with the printed circuit board 4 of the smart watch. Specifically, the wiring point is contacted with a contacting spring pin 8 on the printed circuit board 4 to realize the connection. As an excitation part of the antenna, the main antenna may specifically be a GPS antenna, etc. Reference is made to FIG. 2. A shaded part in FIG. 2 is the wiring 1 of the main antenna. In the figure, the non-metallic casing 3 is shown in a circular ring shape as an example. According to actual requirements, the non-metallic casing 3 may also be in a rectangular ring shape or other shapes, and specific structure of which is not limited herein.

The coupling antenna 2 locates outside the main antenna and at least a part of the main antenna is opposite to the coupling antenna 2 for coupling to the main antenna. As an excited part of the antenna, the coupling antenna 2 is coupled to the main antenna to achieve the required high frequency or low frequency performance. In case of adjusting the antenna performance, a coupling adjustment shall be carried out accordingly. The coupling antenna 2 and the main antenna have opposite parts, so that coupling can be achieved. Of course, there should be no connection between the main antenna and the coupling antenna to achieve coupling.

The coupling antenna 2 serves as a metal lug located at one side of the smart watch and is fixedly connected to the outer wall surface of the non-metallic casing 3. In other words, since the smart watch mostly adopts metal lug to fixedly connect the watch body to the watch strap, for the smart watch with metal lug, a metal lug at one side of the smart watch is used as the coupling antenna 2. That is, the metal lug serves as a supporting structure connecting the watch strap and the watch body. Meanwhile, as a part of the antenna, the metal lug is coupled to the main antenna to realize the function of the antenna. A specific shape of the coupling antenna 2 may be designed according to structural requirement of the smart watch for the metal lug, which is not specifically limited herein.

By applying the antenna of the smart watch provided according to the present application, the main antenna 2 is provided on the non-metallic casing 3 of the smart watch, and a metal lug at one side serves as the coupling antenna 2 to couple to the main antenna to achieve the required high frequency or low frequency performance. With the arrangement of the coupling antenna 2, adverse effect of the metal lug on the antenna performance is avoided. Moreover, at least part of the main antenna is opposite to the coupling antenna 2, which also reduces restriction on the space layout of the main antenna, so that a space that the main antenna can use is larger, which is further conducive to ensuring performance of the antenna.

Specifically, the main antenna is a Laser-Direct-structuring (LDS) antenna, and the wiring 1 of the LDS antenna is laser-etched on the non-metallic casing 3. The LDS antenna uses a computer to control the movement of a laser according to the trajectory of a conductive pattern. The laser is projected onto an antenna bracket, and a circuit pattern is activated within a few seconds. That is, laser technology is adopted to form metal directly on the bracket by chemical plating. In the present application, the non-metallic casing 3 is served as the bracket of the LDS antenna, and metal is formed directly on the non-metallic casing 3 by chemical plating, that is, the wiring 1 of the antenna. The LDS antenna has desirable structural stability and desirable performance consistency, which may avoid the interference of internal components of the smart watch. Moreover, the arrangement of the LDS antenna occupies a relative small space and can effectively use a space with curved surfaces, which is conducive to the miniaturization of the smart watch. A specific path of the wiring 1 may be arranged according to adjustment of the antenna performance, etc., which is not specifically limited herein. According to actual requirements, the main antenna may also be considered being made by other processes.

Furthermore, the wiring 1 is laser-etched on an outer wall surface of the non-metallic casing 3, extends through a through hole to an inner wall surface of the non-metallic casing 3, and forms a wiring point to be electrically connected to a printed circuit board 4 of the smart watch. Due to the miniaturization design requirement of the smart watch, a space inside the non-metallic casing 3 is limited, and the printed circuit board 4 is arranged inside the non-metallic casing 3. In order to ensure the performance of the antenna, the antenna and the printed circuit board 4 need as much avoidance space as possible, so the wiring 1 of the main antenna is mainly arranged on the outer wall surface of the non-metallic casing 3. Moreover, since the main antenna needs to be electrically connected to the printed circuit board 4 inside the non-metallic casing 3, the wiring 1 needs to extend from the outer wall surface of the non-metallic casing 3 to the inner wall surface of the non-metallic casing 3. Specifically, during the laser process, the outer wall surface of the non-metallic casing 3 is directly penetrated through to the inner wall surface to form a through hole by laser. The wiring 1 naturally extends from the outer wall surface to the inner wall surface through the through hole, and the wiring point is formed on the inner wall surface for being electrically connected to the printed circuit board 4 of the smart watch. Arranging the main antenna body on the outer wall surface of the non-metallic casing 3 effectively utilizes the external space of the non-metallic casing 3, reduces the internal space occupation, facilitates the arrangement of internal components, and also helps ensure the performance of the antenna.

Furthermore, the wiring 1 extends from the outer wall surface of the non-metallic casing 3 to the inside of a metal lug served as the coupling antenna 2, and an insulating layer is provided between the metal lug and the wiring 1. For the smart watch, most of the space on the outer circumference of the non-metallic casing 3 is occupied by the metal lug. Therefore, if the main antenna is interlaced with the metal lug, the performance of the main antenna may be affected, which is difficult to perform a lay out in the smart watch with increasing miniaturization requirement. By setting the wiring 1 to extend to the inner side of the metal lug, the wiring 1 is no longer limited to being interlaced with the metal lug, but extends to the inner side of the metal lug according to the antenna performance requirement. Moreover, an insulating layer is arranged between the metal lug and the wiring 1 to form an opposite distribution, and the metal lug on the side opposite to the wiring 1 is used as the coupling antenna 2 to couple with the main antenna.

In order to save internal space, the insulating layer is an insulating paint sprayed on the wiring 1. That is, insulation between the wiring 1 and the metal lug is achieved by spraying the insulating paint on the wiring 1, which is convenient for processing and simplifies the whole process. Moreover, the insulating paint occupies a small space, which is conducive to the miniaturization of the smart watch. In addition, the insulating paint has desirable insulating effect and long service life. The type of the specific insulating paint may be selected as conventional components and proportions in the conventional technology according to requirements. According to requirements, the insulating layer may also be made of insulating materials such as foam, that is, at least one layer of insulating material such as foam is placed between the wiring 1 and the metal lug, which may also play a role of effective insulation. However, compared with insulating paint, the foam occupies more space, and the foam is prone to shift when the metal lug is in worn by the user, and the insulation reliability of the foam is lower than the insulation reliability of insulating paint.

Since at least part of the main antenna is opposite to the coupling antenna 2, in case that the main antenna is partially opposite to the coupling antenna 2, remaining portion of the wiring 1 that is interlaced with the coupling antenna 2 is provided with a rubber-covered casing 5 for insulation, and the rubber-covered casing 5 is fixedly connected to the non-metallic casing 3. The rubber-covered casing 5 may be specifically formed by double-shot molding, and is directly and fixedly connected to the non-metallic casing 3. Alternatively, the rubber-covered casing 5 may also be fixedly connected to the non-metallic casing by means of buckling by arranging a structure such as a snap hook. The shape of the rubber-covered casing 5 may be set according to the outer shape of the smart watch. For example, the smart watch has a circular dial, that is, that is, the non-metallic casing 3 is in an annular shape, the rubber-covered casing 5 is arc-shaped to cover on the outside of the non-metallic casing 3 and be well matched with other surface components, and specifically may be closely attached. The arrangement of the rubber-covered casing 5 may effectively insulate the wiring 1 of the main antenna, make the antenna not affect the overall appearance of the smart watch, and can be applied to smart watches of various shapes.

According to requirements, for a case that the main antenna is partially opposite to the coupling antenna 2, remaining portion of the wiring 1 that is interlaced with the coupling antenna 2 may also be insulated by spraying insulating paint, but the insulating paint is difficult to compensate for the influence of the wiring 1 on the appearance of the smart watch. Alternatively, it is also possible to provide a rigid non-metallic casing outside the portion of the wiring 1 that interlaced with the coupling antenna 2 for insulation. Compared with the rubber-covered casing 5, the rigid structure needs to be separately formed and mounted, and has relatively poor compatibility for smart watches with different shapes.

Further, a side surface of the rubber-covered casing 5 is closely attached to the coupling antenna 2. That is, the side shape of the rubber-covered casing 5 is set to match the shape of the metal lug served as the coupling antenna 2, so as to be closely attached to the metal lug to effectively prevent dust, etc., and the overall appearance is cleaner. It should be noted that in a case that the smart watch has two metal lugs, the coupling antenna 2 serves as one of the metal lugs, which is closely attached to one side of the rubber-covered casing 5. Preferably, the other side of the rubber-covered casing 5 extends to be closely attached to another metal lug to form an integral structure, which is effectively dustproof and has a cleaner overall appearance.

In the above embodiments, the coupling antenna 2 and the non-metallic casing 3 are detachably and fixedly connected. Specifically, screws may be used to fix the coupling antenna 2 on the non-metallic casing 3, or the coupling antenna 2 and the non-metallic casing 3 may be respectively provided with a clamping groove and a snap-in head for engagement. The coupling antenna 2 and the non-metallic casing 3 are detachably connected, which makes the disassembly and assembly more convenient. During processing, the main antenna can be arranged on the non-metallic casing 3 by laser etching and chemical plating the wiring 1 of the antenna. And according to requirements, the rubber-covered casing 5 is formed on a portion of the wiring 1 that is interlaced with the coupling antenna 2 by double-shot molding. Then, an insulating layer, such as spraying insulating paint, is provided outside the part of the main antenna extending to the inner side of the coupling antenna 2, and finally the coupling antenna 2 is fixed on the non-metallic casing 3 to complete the antenna installation. The antenna structure has desirable stability, desirable antenna performance consistency, and high overall reliability.

Based on the antenna provided in the above embodiments, a smart watch is further provided according to the present application, which includes any one of the antennas in the above embodiments. Since the smart watch adopts the antenna in the above embodiments, reference is made to the above embodiments for beneficial effects of the smart watch.

Figure 3:
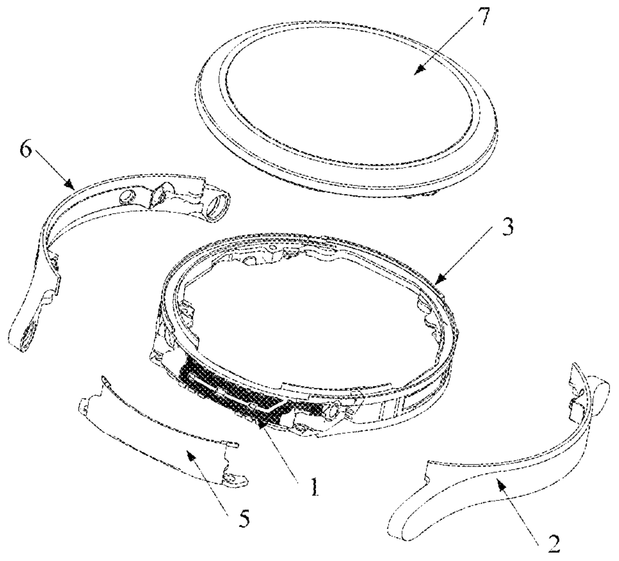
FIG. 3 is a partial explosive view of a smart watch provided according to a specific embodiment of the present application.
Figure 4:
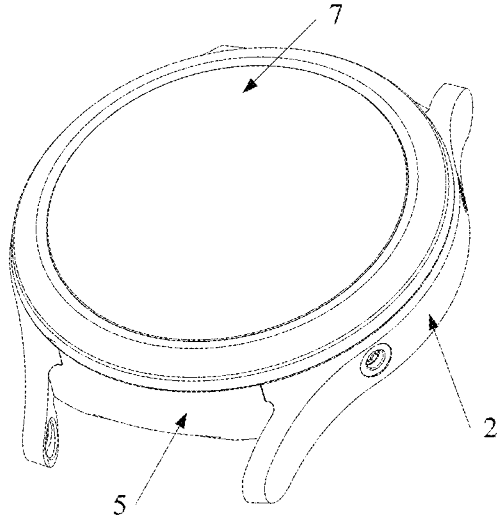
FIG. 4 is a schematic structural view of a smart watch in an assembled state provided according to a specific embodiment of the present application.

Reference is made to FIG. 3 to FIG. 4. FIG. 3 is a partial explosive view of a smart watch provided according to a specific embodiment of the present application; FIG. 4 is a schematic structural view of a smart watch in an assembled state provided according to a specific embodiment of the present application.

In a specific embodiment, two metal lugs are symmetrically and fixedly connected to the outer wall surface of the non-metallic casing 3; one of the metal lugs is the coupling antenna 2, and the other one of the metal lugs is interlaced with the main antenna. FIG. 3 is taken as an example. Two metal lugs are symmetrically and fixedly connected to the outer wall surface of the non-metallic casing 3, one metal lug on the left is marked as the first metal lug 6, and the other one metal lug on the right is marked as the second metal lug. The main antenna is interlaced with the first metal lug 6 and is coupled to the second metal lug, that is, the second metal lug is the coupling antenna 2. With this arrangement, the main antenna is interlaced with a metal lug on one side, so that the metal lug on this side is prevented from affecting the performance of the main antenna. Moreover, the main antenna is coupled to the metal lug on the other side, and the performance of the antenna is effectively ensured by coupling and adjusting with the metal lug. In addition, the layout of the main antenna can take advantage of the position on inner side of the metal lug on this side, which makes the layout of the main antenna more convenient and further ensures the performance of the antenna. In addition, the main antenna is coupled to a single-sided metal lug, which is also convenient for adjustment of the main antenna. Specifically, the metal lug on the side, close to the wiring point of the main antenna, can be used as the coupling antenna 2.

Specifically, the non-metallic casing 3 has an annular shape, a display screen 7 is fixed on the top surface of the non-metallic casing 3, a bottom casing is fixed on the bottom surface of the non-metallic casing 3, and a printed circuit board 4 is mounted inside the non-metallic casing 3. The display screen 7 may specifically be a liquid crystal display screen. Reference is made to conventional setting of the smart watch in the conventional technology for the specific structure setting and connection relationship of the display screen 7, the bottom casing and the printed circuit board 4, which is not specifically limited herein. The shape of the non-metallic casing 3 may also be a rectangular ring or other shapes as required. In FIG. 3, only the non-metallic casing 3 in an annular shape is shown as an example.

The various embodiments are described in a progressive manner or a parallel manner. Each of the embodiments is mainly focused on describing its differences from other embodiments, and reference may be made among these embodiments with respect to the same or similar parts.

It should be further noted that the relationship terminologies such as "first", "second" and the like are only used herein to distinguish one entity or operation from another, rather than to necessitate or imply that the actual relationship or order exists between the entities or operations. Moreover, terms "comprising", "including", or any other variant thereof are intended to encompass a non exclusive inclusion such that processes, methods, articles, or devices that include a series of elements include not only those elements but also those that are not explicitly listed or other elements that are inherent to such processes, methods, articles, or devices. Unless explicitly limited, the statement "including a . . . " does not exclude the case that other similar elements may exist in the process, the method, the article or the device other than enumerated elements.

What is claimed is:

1. A smart watch comprising:

a main antenna provided on a non-metallic casing of the smart watch; and a coupling antenna located outside the main antenna and coupled with the main antenna, wherein at least part of the main antenna is opposite the coupling antenna, wherein the coupling antenna serves as a metal lug located at one side of the smart watch and is fixedly connected to an outer wall surface of the non-metallic casing, and wherein the coupling antenna is detachably and fixedly connected to the non-metallic casing.

2. The smart watch according to claim 1, wherein the main antenna is a laser-direct-structuring (LDS) antenna, and a wiring of the LDS antenna is laser-etched on the non-metallic casing.

3. The smart watch according to claim 2, wherein the wiring is laser-etched on the outer wall surface of the non-metallic casing and extends through a through hole to an inner wall surface of the non-metallic casing to form a wiring point to be electrically connected to a printed circuit board of the smart watch.

4. The smart watch according to claim 3, wherein the wiring extends from the outer wall surface of the non-metallic casing to an inner side of the coupling antenna, and an insulating layer is provided between the coupling antenna and the wiring.

5. The smart watch according to claim 4, wherein the insulating layer is an insulating paint sprayed on the wiring.

6. The smart watch according to claim 4, wherein the wiring that is interlaced with the coupling antenna is provided with a rubber-covered casing outside of the wiring for insulation, and the rubber-covered casing is fixedly connected to the non-metallic casing.

7. The smart watch according to claim 6, wherein a side surface of the rubber-covered casing is closely attached to the coupling antenna.

8. The smart watch according to claim 1, wherein two metal lugs are symmetrically and fixedly connected to the outer wall surface of the non-metallic casing, wherein one of the metal lugs is the coupling antenna, and the other one of the metal lugs is interlaced with the main antenna.

9. A smart watch comprising:

a laser-direct-structuring (LDS) antenna provided on a non-metallic casing of the smart watch, wherein a wiring of the LDS antenna is laser-etched on an outer wall surface of the non-metallic casing and extends through a through hole to an inner wall surface of the non-metallic casing to form a wiring point to be electrically connected to a printed circuit board of the smart watch; and a coupling antenna located outside the LDS antenna and coupled with the LDS antenna, wherein at least part of the LDS antenna is opposite the coupling antenna, and wherein the coupling antenna serves as a metal lug located at one side of the smart watch and is fixedly connected to the outer wall surface of the non-metallic casing.

10. The smart watch according to claim 9, wherein the wiring extends from the outer wall surface of the non-metallic casing to an inner side of the coupling antenna, and an insulating layer is provided between the coupling antenna and the wiring.

11. The smart watch according to claim 10, wherein the insulating layer is an insulating paint sprayed on the wiring.

12. The smart watch according to claim 10, wherein the wiring that is interlaced with the coupling antenna is provided with a rubber-covered casing outside of the wiring for insulation, and the rubber-covered casing is fixedly connected to the non-metallic casing.

13. The smart watch according to claim 12, wherein a side surface of the rubber-covered casing is closely attached to the coupling antenna.

14. The smart watch according to claim 9, wherein two metal lugs are symmetrically and fixedly connected to the outer wall surface of the non-metallic casing, wherein one of the metal lugs is the coupling antenna, and the other one of the metal lugs is interlaced with the main antenna.

15. A smart watch comprising:

a main antenna provided on a non-metallic casing of the smart watch; and a coupling antenna located outside the main antenna and coupled with the main antenna, wherein at least part of the main antenna is opposite the coupling antenna, wherein the coupling antenna is one of two metal lugs symmetrically and fixedly connected to the outer wall surface of the non-metallic casing, and wherein the other one of the two metal lugs is interlaced with the main antenna.

16. The smart watch according to claim 15, wherein the main antenna is a laser-direct-structuring (LDS) antenna, and a wiring of the LDS antenna is laser-etched on the non-metallic casing.

17. The smart watch according to claim 16, wherein the wiring is laser-etched on the outer wall surface of the non-metallic casing and extends through a through hole to an inner wall surface of the non-metallic casing to form a wiring point to be electrically connected to a printed circuit board of the smart watch.

18. The smart watch according to claim 17, wherein the wiring extends from the outer wall surface of the non-metallic casing to an inner side of the coupling antenna, and an insulating layer is provided between the coupling antenna and the wiring.

19. The smart watch according to claim 18, wherein the insulating layer is an insulating paint sprayed on the wiring.

20. The smart watch according to claim 18, wherein the wiring that is interlaced with the coupling antenna is provided with a rubber-covered casing outside of the wiring for insulation, and the rubber-covered casing is fixedly connected to the non-metallic casing.

* * * * *